June 14, 1955  T. J. MORRISON, JR., ET AL  2,710,924
FLUORIMETER
Filed Jan. 13, 1954   3 Sheets-Sheet 1
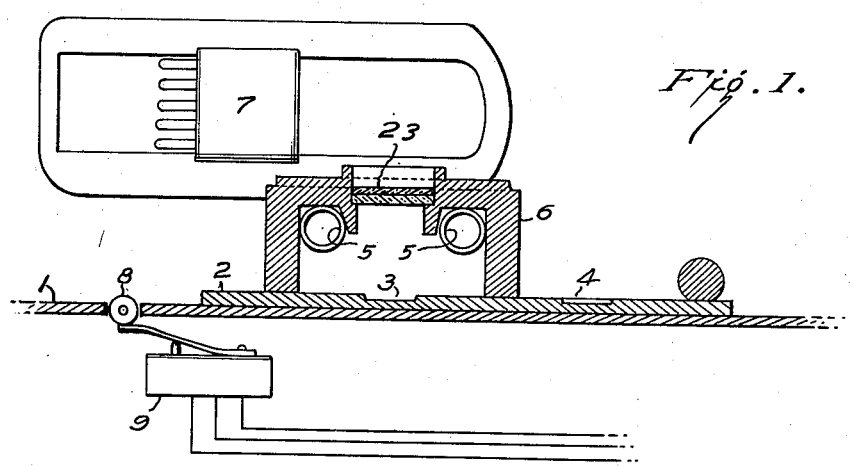
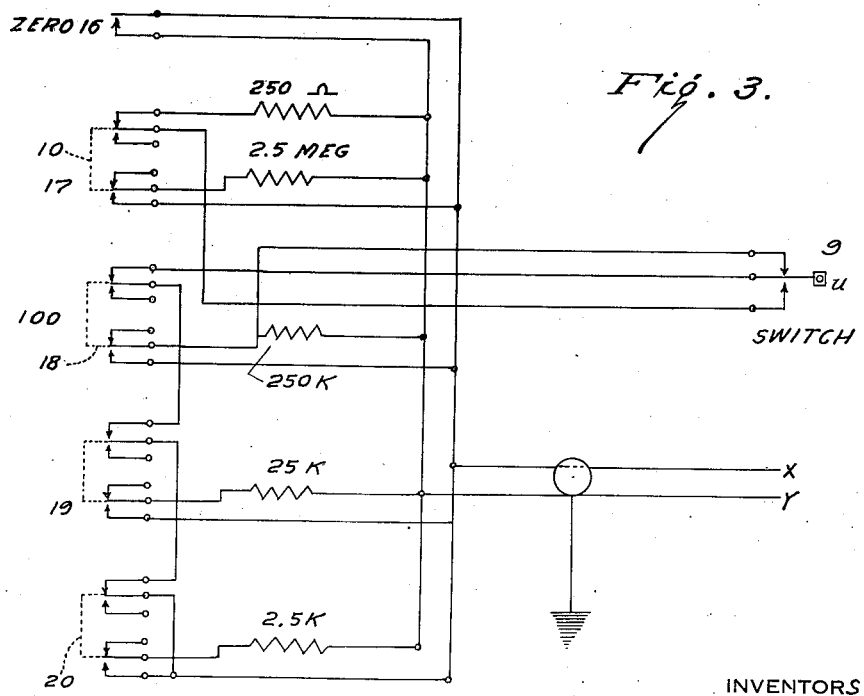
INVENTORS
THOMAS J. MORRISON, JR.,
PAUL GALVANEK, JR.
BY
ATTORNEY

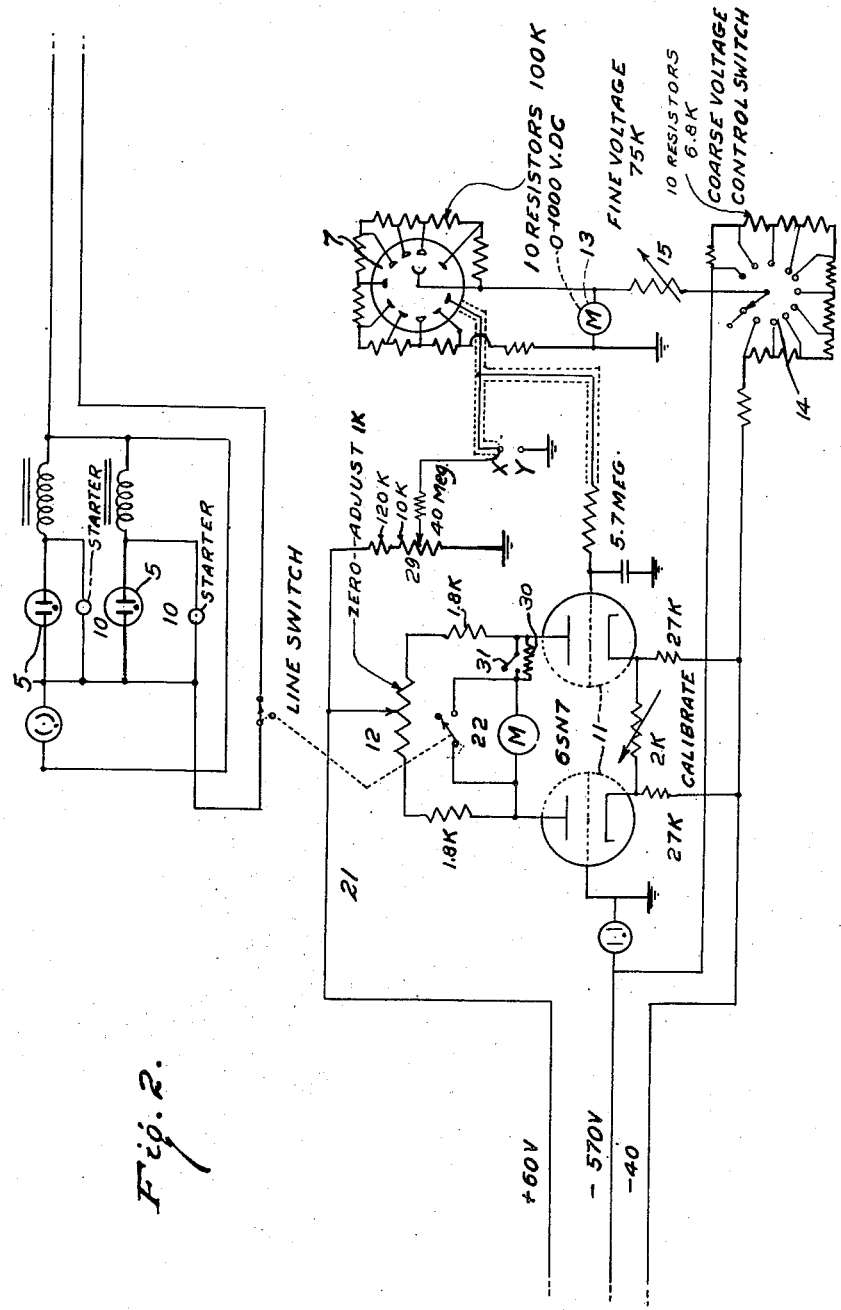

June 14, 1955     T. J. MORRISON, JR., ET AL     2,710,924
FLUORIMETER

Filed Jan. 13, 1954                            3 Sheets-Sheet 3

INVENTOR:
THOMAS J. MORRISON, JR.
PAUL GALVANEK, JR.

BY
ATTORNEY

2,710,924
FLUORIMETER

Thomas J. Morrison, Jr., Newtonville, and Paul Galvanek, Jr., Boston, Mass., assignors to American Cyanamid Company, New York, N. Y., a corporation of Maine Application January 13, 1954, Serial No. 403,741

11 Claims. (Cl. 250—52)

This invention relates to an improved fluorimeter for measuring fluorescence of samples against fluorescing standards.

Fluorimeters have been used extensively as a quick method of analysis for mixtures containing fluorescent material. One type of instrument which has been used practically is a comparison type of instrument in which the fluorescence of a sample is compared with the fluorescence of a standard. All of the advantages of accurate calibration and of comparison instruments, have made this instrument desirable for fluorescence measurement. The comparison type fluorimeters have, however, been subject to a number of disadvantages for the measurement of samples containing only a small amount of fluorescent material. It has been necessary to use very high intensity ultra-violet light sources, together with photomultiplier tubes operated at high voltages in order to provide the necessary sensitivity in the amplification of the weak fluorescent light striking the photo tube. These requirements have introduced severe practical disadvantages. In the first place the high intensity ultraviolet energy has been obtained only by the use of high wattage tubes, with the concomitant problems associated with the large heat evolution of these tubes, and the high voltage requirements for photomultiplier tubes, where maximum sensitivity is required, has practically precluded the possibility of relatively light instruments which can be developed for portable use.

Another problem is presented by the very sensitive measuring instruments, such as galvanometers which have been required in the past. These instruments are relatively fragile against mechanical shocks which make them unsuitable for many portable or rough usages in environments where the instrument cannot be protected against shock and it is difficult to obtain as reliable calibration of the extremely sensitive instrument. Another problem arises when it is necessary to use more than one range of sensitivity. Excessive currents in high sensitivity galvanometers can seriously damage the instrument. This has made it practically essential that high sensitivity instruments should be operated by skilled personnel and frequently by personnel at the professional level.

The present invention is directed to an improved comparison type fluorimeter in which the above disadvantages have been eliminated. The improved instrument includes three features which the first is the most important, although for optimum results it is desirable to incorporate all three features into the instrument.

The first feature utilizes a different type of ultra-violet light source with a new and more efficient light-transmitting characteristic. These sources are available at present commercially in the F4T5 black light blue tube currently manufactured by Sylvania Manufacturing Company. Essentially these tubes are low wattage, mercury vapor tubes with a phosphor and a filter shell of high transmission in the ultra-violet, substantially 90% at the 365 millimicron wave length, which is the dominant wave length of the tube. There is a little emission in the violet and a very small secondary emission in the red. These low wattage lamps, which are currently designed to operate at about four watts, generate so little heat that they can be placed very close to the sample and standard respectively in a fluorimeter without problems of heat dissipation. The spacing from the sample should not exceed 3" and is preferably an inch or less. As a result, a very efficient illumination of the sample is obtained. At the same time the low heat permits placing filters for the fluorescent light and the photomultiplier tube itself much closer to the sample, and therefore permits a larger percentage of the fluorescent light from sample or standard to strike the photomultiplier tube.

As a result of the close spacing of light source from sample, a greater amount of fluorescent light strikes the photomultiplier tube cathode from a given sample than is obtainable practically with high wattage sources. The exact wattage of the lamps is not critical but should be sufficient to provide an illumination at the sample of 2.3 milliwatts per square centimeter. The upper limit of wattage is determined by a heating effect and should not exceed twenty-five watts.

While the present invention is not limited to any particular design of lamp and lamp housing which brings high transmission low wattage ultra-violet sources closely adjacent to the samples to be illuminated, we find it desirable to use a compact, relatively flat housing of good heat conductivity, such as aluminum, with two lamps arranged to direct their light on a sample or standard exposed between them.

The greatly increased amount of fluorescent light from the samples and standards which actually strikes the cathode of the photomultiplier tube by reason of the first feature of the present invention, makes it possible to operate the photomultiplier tube at comparatively low voltage. While the exact voltage will be determined in each instance for optimum response, we find it practical to use voltages from 400 to 600 volts as measured between the cathode and anode of the photomultiplier tube. This relatively low voltage as compared to the 900 to 1200 volts which is ordinarily used in the earlier comparison type instruments with high wattage ultraviolet light sources not only greatly cheapens the power supply when the instrument is to be completely A. C. operated, but makes it possible to use batteries for portable instruments.

The greatly increased fluorescent light available at the detector makes it possible to use an ordinary phototube and amplifier instead of the photoelectric amplification of a photomultiplier tube. While such instruments are included in the broadest aspects of the present invention the great sensitivity of photomultiplier tubes makes them desirable in many instances. Their greater reliability is also a factor which contributes to making them the preferred type of fluorescent light detector.

The second feature of the present invention which is included in a more specific aspect thereof, is a sample and standard selector with automatic protection of the indicating instrument against overload. Essentially this feature includes means for successively exposing one or more samples together with a standard to the ultraviolet illumination. Where a single sample is used or a relatively small number of samples a slide with various sample and standard holders constitutes the most simple mechanical device. Sample and standard selecting means also actuate a switch so that when the standard or sample is thrown into the ultra-violet illumination the sensitivity of the indicating instrument is sufficiently low to prevent damage. At the same time, the correct sensitivity range for the standard is selected and any manual operation of sensitivity range selectors will only decrease sensitivity when the standard is being illuminated.

A third feature which constitutes an even more specific embodiment of the present invention is the use of a stable, rugged, electron tube amplifier and a rugged moderate sensitivity instrument such as, for example, a standard type of microammeter. This permits using a much more reliable and simple type of instrument without sacrifice or sensitivity.

For ordinary analytical work, measurement of total fluorescence in a particular spectral range is all that is needed, and in the case of fluorescence which is sufficiently far removed from the faint blue and red light transmitted by the tubes, it is not necessary to interpose any additional filters between the light sources and the sample. When the fluorimeter is to be used for measurement of fluorescence which has important components in the blue and violet or in the red, as for example, optical brighteners or bleaches which are used with soaps and other detergents to increase the whiteness of white material, the emission of the light sources in the blue, although small, is still a sufficient proportion of the intensity of fluorescent light so that it can interfere with the accuracy of the instrument. In such cases, conventional filters may be interposed between the light sources and sample to remove any visible light components from the ultra-violet light.

When the machine is provided with additional filters so that the sample and standard is illuminated only with ultra-violet light without any visible component, it is also possible to obtain readings from a modification of the instrument which can be used for other purposes. Thus it is possible to provide for the interposition between sample and photomultiplier tube of filters which correspond to tristimulus curves so that three readings can be obtained proportional to the tristimulus values of a given fluorescence. This permits obtaining data by suitable calculation on practically all of the color characteristics of a given fluorescing material, such as its Munsell units of hue, chroma, and value. When the instrument is modified to obtain tristimulus data, it is usually necessary to employ a filter for removing ultra-violet light which does not selectively absorb in the visible. Such filters are well-known and are obtained normally by using cells containing suitable solutions of absorbing material.

The invention will be described in greater detail in conjunction with the drawings in which:

Fig. 1 is a vertical section through the illuminating and photomultiplier parts of the instrument;

Fig. 2 is a schematic of the main electrical circuits;

Fig. 3 is a schematic of the switching portions of the instrument;

Figure 5:
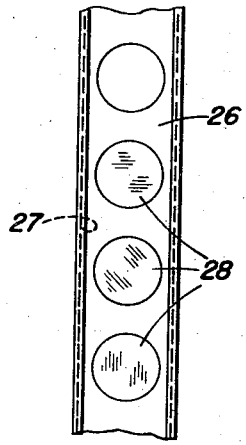
Figure 5 is a plan view of a modified slide providing three sample holders.

In Figure 1, the frame of the instrument is shown at 1 on which a slide 2 moves. It is capable of bringing successively into register standard holding depression 3 and sample holding depression 4. These depressions register with an opening in the lighting housing 6, which is preferably an aluminum casting. Two low wattage ultra-violet tubes of the F4T5 type are shown at 5 immediately adjacent to the opening for sample and standard and directing a large portion of their ultra-violet light onto sample or standard which causes them to fluoresce and the visible light produced, then passes through a filter 23, which absorbs ultra-violet light permitting only visible light to strike the cathode of photomultiplier tube 7.

When the sample is introduced by sliding the slide 2 a trigger 8 of a normally open single pole double throw switch 9 throws a suitable shunt resistance into the indicating meter circuit as will be described in more detail below.

In Figure 2, is shown the main electrical circuits for the instrument, which is illustrated in the form of an A. C. operated instrument. A double switch 21 serves as a line switch and shorts out the meter 22 when the instrument is not in operation. The UV tubes 5 are actuated through conventional inductances and starters 10, a neon tube being provided as an indication that the instrument is operating. The grounded supply (not shown), is of standard design, but is very closely regulated, using several regulating tubes in series for the necessary high voltage. As the design of the power supply does not constitute any part of the present invention it is not shown and its output voltages only are indicated. The voltages, measured with respect to ground, are plus 60 volts minus 40 volts and minus 570 volts respectively. The +60 volt line passes through a zero adjusting potentiometer and plate resistors to the plates of a 6SN7 dual triode. The cathodes of the triode are connected through the conventional cathode resistors to —40 volts. The usual calibration is effected by a variable resistance between the cathodes. The meter 22, which is a standard 0–100 microammeter is connected in a bridge circuit of conventional design similar to the standard circuits for vacuum tube voltmeters, except that the meter is in the plate circuit rather than in the cathode circuits. The resistance values are shown on the drawing. The resistors are all of a wattage double that ordinarily used in vacuum tube voltmeter circuits, in order to provide maximum stability and minimum temperature drift.

Minus 570 volts D. C. is applied to a multicontact switch 14 which connects to different points of a voltage divider circuit composed of resistors of the values shown. This acts as a coarse voltage control switch for the photomultiplier tube. A neon tube is an indicator that the high voltage is present. From the switch 14 current flows through a rheostat 15, acting as a fine voltage control, to the cathode of the photomultiplier tube 7. The voltmeter 13 is used for indicating purposes.

The output from the photomultiplier tube anode passes through one of the resistors shown on Figure 3, resulting in a variable voltage drop which actuates one grid of the 6SN7.

Figure 3 is a schematic diagram of the wiring of the switches for the various sensitivity ranges. These switches are five in number, switch 16 being a normally open short circuiting switch for zero calibration of the meter and switches 17, 18, 19 and 20 being spring loaded two-position double pole switches. The figure shows all switches in their normal positions under influence of the respective spring pressures and shows the switch 9 in the position which it occupies when the standard is being illuminated, in other words in the position in which it is shown in Figure 1.

Zero adjustment of the meter is effected by temporarily closing switch 16. This short circuits the anode of the photomultiplier tube to ground. In other words, it puts the right hand grid of the 6SN7 at ground potential, as is the left hand grid, and the meter is then adjusted to read zero by means of the potentiometer 12.

After the meter has been adjusted for zero it is calibrated for the standard by adjusting the coarse and fine voltage controls until the meter reads full scale or any other point on the scale which is chosen to indicate 100% of standard. If then the slide 2 is moved to bring the sample under the ultra-violet lights, switch 9 is automatically opened and this throws the lowest resistor of 250 ohms into circuit. This is the resistor connected to the top position of switch 17. The circuit is from the grounded bus connecting all of the resistor leads and leading to the point Y. The connection is then through the 250 ohm resistor, the upper position of switch 17, switch 9 to the upper position of switch 18 and thence to the upper positions of switches 19 and 20, to the bus connecting through a shielded cable to point X and thence to the anode of the photomultiplier tube 7. This anode also connects through the 5.7 meg. resistor to the right hand grid of the 6SN7. The 250 ohm resistor provides the least sensitive range for the instrument, and no ordinary sample will damage the meter as usually samples will not exceed the maximum fluorescence for the least sensitive range of the instrument. There is therefore no possibility of damaging the meter by accidentally throwing a strong sample into the ultra-violet beam when the instrument is set for a range of high sensitivity. Meter danger is also eliminated by the inherent protective action of the electronic amplifying circuit, which will not permit a current through the meter, more than 50% in excess of full scale.

If, as will usually be the case, the sample will not fluoresce so strongly a more sensitive range will be used, and this range is chosen by throwing one of the switches 17 to 20. Thus, for example, if maximum sensitivity is desired (10,000 times minimum), with a very weakly fluorescent sample, which might represent the situation where the content of fluorescent material for which analysis is made is very small, switch 17 is actuated throwing into circuit the 2.5 meg. resistor which provides maximum sensitivity. Throwing switch 18 introduces the next most sensitive range which is the one used for the standard while 19 and 20 in turn introduce ranges of lower sensitivity. For convenience the range is varied in steps of 10. It should be noted that if inadvertently any of the switches 17 to 20 are thrown while the standard is being illuminated, this cannot result in excessive sensitivity because the only effect of throwing any of the switches is to introduce their resistors in parallel with the 250K resistor for the standard range and so the only result is to cause a lower reading of the standard. This further insures against excessive sensitivity by accidental misoperation.

Figure 4:
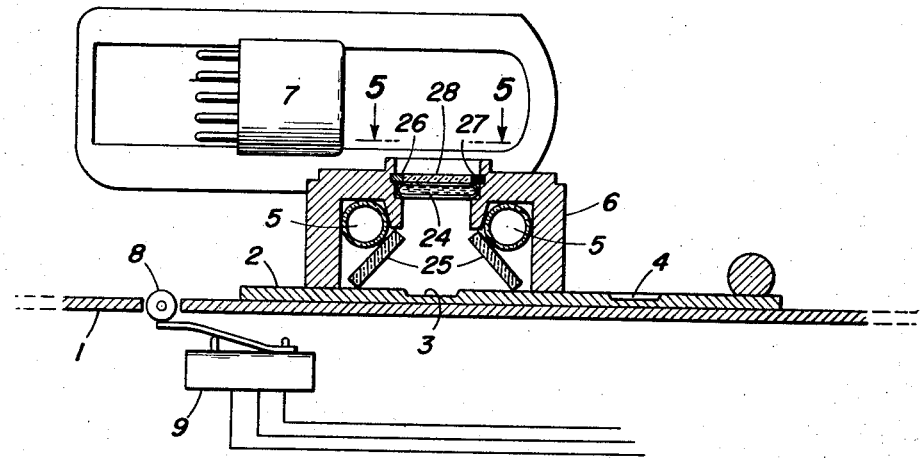
Fig. 4 is a vertical section through the illuminating and photomultiplier parts of a modified instrument for obtaining tristimulus data.

In Figure 4 the instrument is modified for tristimulus data. The same parts are given the same reference numerals. The illuminating housing 6 differs from Fig. 1 in that filters 25 are interposed between the light sources 5 and the sample and standard. These filters remove the residual visible components from the light sources so that the sample is illuminated with pure ultra-violet light.

Instead of the glass filters 23, there is provided a solution filter in a cell 24 which removes ultra-violet light without any substantial visual absorption in the visible part of the spectrum. A slide 26 slides in a slot 27 of the house 6. This slide is provided with three or six filters 28 (one being shown). These filters correspond to the tristimulus curves for two predetermined illuminants such as daylight and standard tungsten. The slide is also provided with a blank opening (not shown) which permits using the instrument for total fluorescence measurements, in which case the instrument operates as does the modification in Fig. 1, except for the fact that there are no visible light components in the ultra-violet light illuminating the sample.

Except for Figure 1, all of the drawings are diagrammatic as the mounting of the meters, switches and the like forms no part of the present invention and their position will be dictated by the design features of the instrument housing. It is desirable to prevent pickup in the actual lines connecting to the right grid of the 6SN7 and accordingly these are shown as shielded, such as a coaxial cable. The rest of the circuit presents no special engineering problems and follows standard practice in low output circuits such as those involving photomultiplier tubes.

This application is in part a continuation of our co-pending application Serial No. 302,434, filed August 2, 1952, now abandoned.

We claim:

1. A reflectance fluorimeter comprising in combination a light housing of high heat dissipating properties, at least one source of ultraviolet light in close proximity to the inner walls of the housing, means for introducing successively into the illumination at least one sample in close proximity to the ultraviolet source and positioned to receive direct radiation therefrom over a substantially non-converging path, the total wattage of the ultraviolet sources not exceeding 25 watts and being at least sufficient to provide an average illumination on the sample of 2.3 milliwatts per centimeter, the ultraviolet sources being located not more than 3″ from the sample, a high sensitivity visible light radiation detector, means including ultraviolet rejecting filters positioned on the same side of the sample introducing means as the ultraviolet light source and permitting visible light from the sample after passing through the filters to strike the visible light detector and means for measuring the output of said detector.

2. An instrument according to claim 1 in which the visible light radiation detector is a photomultiplier tube.

3. A comparison type reflectance fluorimeter comprising in combination a high heat dissipating light housing, at least once source of the ultraviolet light in close proximity to the inner walls of said housing, means for introducing successively into the illumination at least one sample and a standard in close proximity to the ultraviolet source and positioned to receive direct radiation from the ultraviolet source on a substantially non-converging path, the total wattage of the ultraviolet sources not exceeding 25 watts and being at least sufficient to provide an average illumination on the sample of 2.3 milliwatts per centimeter, the ultraviolet sources being located not more than 3″ from the sample, a high sensitivity visible light radiation detector, means including ultraviolet rejecting filters positioned on the same side of the sample introducing means as the ultraviolet light source and permitting visible light from the sample after passing through the filters to strike the visible light detector and means for measuring the output of said detector.

4. An instrument according to claim 1, in which the radiation detector for visible light is a photoelectric detector and the indicating means is multirange, the means for successively introducing samples and standard into the illumination of the ultra-violet sources being a carrier provided with sample and standard holding means and a range selecting means selecting a range of suitable sensitivity for the standard actuated by the carrier in the position in which the standard is brought into the ultra-violet illumination.

5. An instrument according to claim 4, in which the detector for visible light is a photomultiplier tube.

6. An instrument according to claim 5, in which the photomultiplier tube is operated at reduced voltages and the indicating means comprises a vacuum tube amplifier and meter.

7. An instrument according to claim 6, in which the output from the photomultiplier tube is through a series of selectable resistors to produce variable potential drops and means for applying said potential drops to the input of the vacuum tube amplifying circuit.

8. An instrument according to claim 7, in which switching means are provided for connecting a suitable range resistor for the standard, said switching being actuated by the means for introducing the standard into the illumination of the ultra-violet tubes, the other range selecting resistors being connected so that selection of any range throws the resistor in parallel with the standard range selecting resistor.

9. An instrument according to claim 8, provided with means for varying the voltage on the photomultiplier tube to calibrate instrument readings when the standard is illuminated.

10. An instrument according to claim 1 in which the ultra-violet illuminating means of the sample produces an illumination substantially free from visible light, and means for successively interposing filters between the sample and the light radiation detector which pass light proportional to each of at least three tristimuli.

11. An instrument according to claim 10 in which the filters passing light proportional to the tristimuli are mounted in a slide sliding into the housing between sample and light radiation detector, said slide being further provided with a transparent opening having no selective light absorption in the visible spectrum.

References Cited in the file of this patent

UNITED STATES PATENTS

| | | |
|---|---|---|
| 2,273,356 | Holven et al. | Feb. 17, 1942 |
| 2,551,542 | Marsh et al. | May 1, 1951 |
| 2,663,801 | Slavin et al. | Dec. 22, 1953 |